(12) United States Patent
Romrell et al.

(10) Patent No.: US 7,974,288 B2
(45) Date of Patent: Jul. 5, 2011

(54) TUNNELING FOR EFFICIENT NETWORK TRAFFIC MANAGEMENT (75) Inventors: David Romrell, Hillsboro, OR (US); Christopher Charles Ptacek, Beaverton, OR (US)

(73) Assignee: Barracuda Networks Inc, Campbell, CA (US)

( * ) Notice: Subject to any disclaimer, the term of this patent is extended or adjusted under 35 U.S.C. 154(b) by 84 days.

(21) Appl. No.: 12/467,007

(22) Filed: May 15, 2009

(65) Prior Publication Data

US 2009/0279550 A1    Nov. 12, 2009

Related U.S. Application Data (62) Division of application No. 11/404,049, filed on Apr. 13, 2006.

(51) Int. Cl.
*H04L 12/56* (2006.01)
(52) U.S. Cl. .................. 370/392; 370/395.3; 370/395.5
(58) Field of Classification Search .................. 370/352, 370/395.3, 395.5, 392
See application file for complete search history.

(56) References Cited

U.S. PATENT DOCUMENTS

| 6,947,483 | B2 * | 9/2005 | Engwer | 375/240 |
| 7,324,447 | B1 * | 1/2008 | Morford | 370/231 |
| 7,359,974 | B1 * | 4/2008 | Quinn et al. | 709/228 |
| 2002/0097724 | A1 * | 7/2002 | Halme et al. | 370/392 |
| 2003/0108041 | A1 * | 6/2003 | Aysan et al. | 370/389 |
| 2004/0088385 | A1 * | 5/2004 | Blanchet et al. | 709/220 |
| 2005/0276279 | A1 * | 12/2005 | Peschi | 370/466 |
| 2009/0296734 | A1 * | 12/2009 | Nag | 370/462 |

OTHER PUBLICATIONS

E. Rosen, "RFC 3031 Multiprotocol Label Switching Architecture", Jan. 2001, Network Working Group, pp. 1-57.*

* cited by examiner

*Primary Examiner* — Dang T Ton
*Assistant Examiner* — Ryan C. Kavleski
(74) *Attorney, Agent, or Firm* — Patentry (57) ABSTRACT

Data traffic is scheduled by, in a first scheduler, selecting a source of traffic from a plurality of sources of traffic, each source being associated with a second scheduler, in a second scheduler associated with the selected source of traffic, selecting a type of traffic from a plurality of types of traffic within the source selected by the first scheduler, and transmitting data of the selected type and source. Identifying and creating tunnels between endpoints in a network for optimum data traffic method and apparatus.

1 Claim, 7 Drawing Sheets

TUNNELING FOR EFFICIENT NETWORK TRAFFIC MANAGEMENT

CROSS-REFERENCE TO RELATED APPLICATIONS

This is a division of application Ser. No. 11/404,049, Filed Apr. 13, 2006, now patent Ser. No. 2007/0242675 issued October 2007.

BACKGROUND

Figure 1:
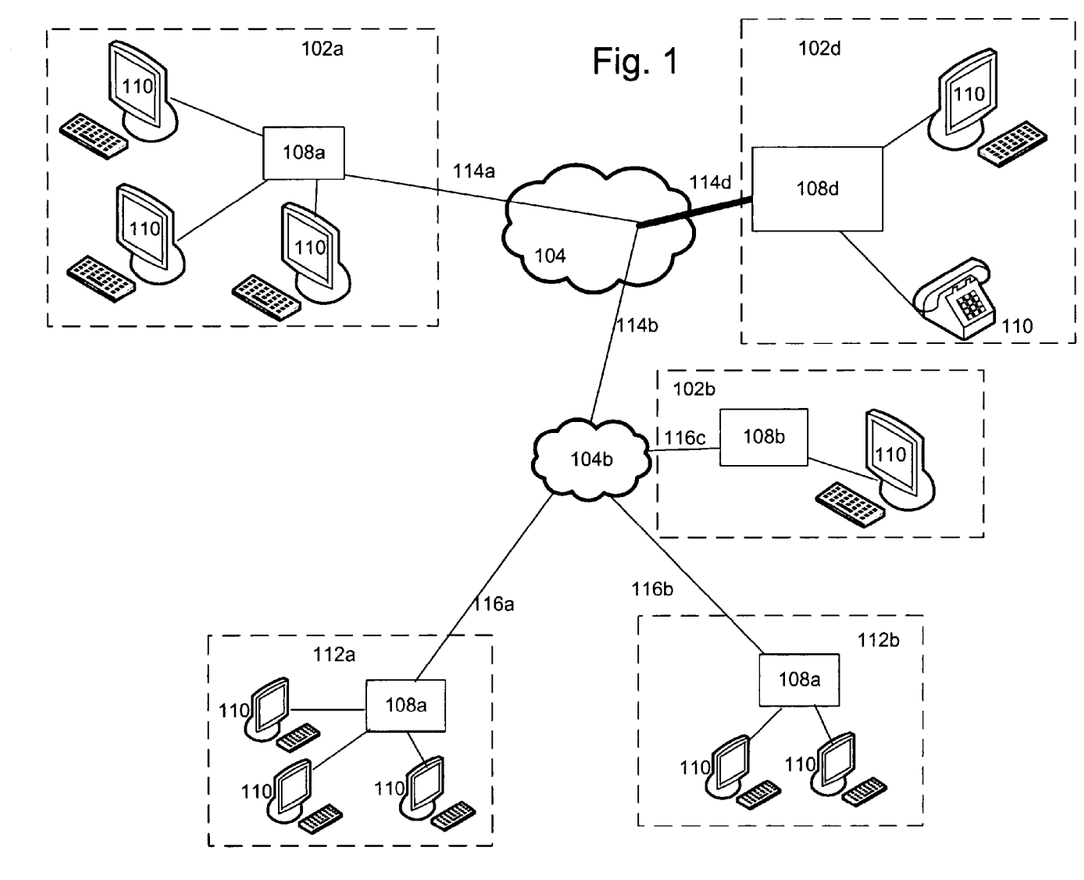
FIGS. 1 and 2 are block diagrams of a network.

In operating a network, it is sometimes necessary to control the flow of data from one point to another. This is especially true in complex network topologies, such as a tiered structure as shown in FIG. 1, with a central site 102d and several layers of sub-networks 102a, b, 112a, b each going through one or more links to reach the central site 102d. Previous systems for managing network traffic have relied on class based queuing (CBQ) or other scheduling systems to implement link level scheduling, that is, scheduling which of several links can send network traffic over an uplink to another tier of the network. Other systems have used data compression, requiring modifications to the systems at either end of a compressed link. Issues in scheduling network traffic include link oversubscription, where the various links into a node have a higher total traffic than the link out of the node to another part of the network, guaranteeing bandwidth amounts to various links and various classes of data traffic, and compensating for the effects of compression on allocation of bandwidth.

SUMMARY

In general, in one aspect, data traffic is scheduled by, in a first scheduler, selecting a source of traffic from a plurality of sources of traffic, each source being associated with a second scheduler, in a second scheduler associated with the selected source of traffic, selecting a type of traffic from a plurality of types of traffic within the source selected by the first scheduler, and transmitting data of the selected type and source.

Implementations include one or more of the following. Repeating the selecting and transmitting. The traffic is traffic for passing over a communications link. The selecting includes scheduling the selection of sources and types according to characteristics of the communications link. Selecting a source of traffic includes selecting a source from which packets should be delivered according to a rule. Delivering packets according to the rule includes one or more of guaranteeing a minimum bandwidth for a source of the plurality of sources, guaranteeing a maximum burst limit for a source of the plurality of sources, and guaranteeing a service interval to a source of the plurality of sources. Choosing a source of traffic includes allowing a user to configure a pre-emptive priority for a type of traffic. In the first scheduler, accounting for bandwidth used by each source of traffic. Selecting a type of traffic includes selecting a type from which packets should be delivered according to a rule. Delivering packets according to the rule includes one or more of guaranteeing a minimum bandwidth to a type, within an amount of bandwidth allocated by the first scheduler, guaranteeing a maximum burst limit to a type, within a burst limit allocated by the first scheduler, and guaranteeing a service interval to a type. The types of traffic include overlapping classifications of traffic. Before the selecting, filtering the traffic based on routes the traffic will use. The filtering includes applying a radix tree algorithm. Determining that a packet from the selected type is to be transmitted through a tunnel, and selecting a type includes charging the type for bandwidth usage based on an average efficiency of the tunnel.

In general, in one aspect, data traffic is scheduled by selecting a type of traffic, and determining that a packet from the selected type is to be transmitted through a tunnel, in which selecting the type includes charging the type for bandwidth usage based on an average efficiency of the tunnel.

Implementations may include one or more of the following features. Adding the selected packet to a queue for the tunnel. Extracting a packet from the queue for the tunnel based on one or more of efficiency of the tunnel, responsiveness of the tunnel, a maximum delay of the tunnel, and a minimum buffer of the tunnel. Compressing packets in the queue for the tunnel, updating an average compression ratio of the tunnel, and transmitting the compressed packets according to a scheduler that selects sources of traffic from a plurality of sources of traffic. Encrypting packets in the queue for the tunnel, updating an average expansion ratio of the encryption, and transmitting the encrypted packets according to a scheduler that selects sources of traffic from a plurality of sources of traffic. Selecting a type includes using a class-based queuing algorithm.

In general, in one aspect, an amount of bandwidth to be used by a compression tunnel is determined by determining a pre-compression bandwidth limit for a type of traffic, determining a post-compression bandwidth limit for the tunnel, compressing data, including data from the type, determining a compression ratio, based on the compression ratio, determining an amount of pre-compression bandwidth used by the tunnel, and determining an amount of post-compression bandwidth used by the tunnel, and communicating the determined amounts to a scheduling process for the type. For each of a plurality of types of traffic, guaranteeing an amount of bandwidth, determination of the guaranteed amount being based on the compression ratio. Scheduling types to use the tunnel based on the compression ratio and the determined amounts.

In general, in one aspect, for a plurality of endpoints of routes through a network, pairs of endpoints that can support tunnels to each other are identified, and identifications of the identified pairs of endpoints are recorded in a definition file. At each endpoint, the definition file is received, the identifications of other endpoints that the endpoint is paired with are read from the definition file, and a tunnel is created to each paired endpoint.

Implementations may include a centralized server performing the identifying and recording.

In general, in one aspect, packets to be transmitted are received. For each packet, a class and a link are identified, whether the packet should be transmitted using a tunnel is determined, the packet is added to a queue of packets having the same class as the packet, a class of packets is selected, packets from the selected class which are to be transmitted using the tunnel are added to a queue for the tunnel, the packets in the queue are adapted for the tunnel, producing adapted packets, adapted packets are added to a queue of packets to be transmitted on the link identified for the packets, a link is selected, and packets are transmitted from the queue for that link.

Implementations may include one or more of the following. Adapting the packets includes compressing the packets. Adapting the packets includes encrypting the packets. Adapting the packets includes encrypting and compressing the packets. Selecting a class of packets includes determining, for each class of packets, a number of bytes that have been compressed, a number of compressed bytes that have been transmitted, and a compression ratio, and selecting a class based on the compression ratio and the number of compressed bytes that have been transmitted for each class. Adapting the packets for the tunnel includes, for each packet, removing a network header from the packet, performing an operation on the packet to create an adapted packet, and adding a network header corresponding to a destination to the adapted packet. Receiving transmitted packets at the destination and for each packet that was transmitted using the tunnel, performing an inverse of the operation on the packet, adding a second network header to the packet, and transmitting the packet according to the second network header.

Advantages include the following. Bandwidth can be guaranteed to each branch in an oversubscribed network with thousands of links. Compression can be applied to a whole pipe or on a selective basis based on classes within a link. Certain types of traffic can be explicitly excluded from compression. The bandwidth used by a compression tunnel can be managed to a specified value. The bandwidth that a particular application or class of applications uses can be controlled to be within a specified range.

The details of one or more embodiments of the invention are set forth in the accompanying drawings and the description below. Other features, objects, and advantages of the invention will be apparent from the description and drawings, and from the claims.

DETAILED DESCRIPTION

In a central site network, such as that shown in FIG. 1, multiple remote sites 102a, b and a central site 102d each have a single connection 114a, b, d, referred to as a link, through a network 104, such as the Internet or a private IP network. Each site has network hardware 108a, b, d, which facilitates connections between devices 110 and the network links 114a, b, d, respectively. The remote sites 102a,b may also have links 116a, b to additional remote sites 112a, b connected through another network 104b. In such a case, the link to the local network hardware is shown as another link 116c, sharing the link 114b back to the central site 102d with the other remote links 116a, b. Connections between endpoints on the network are referred to as links, which may differ from actual network connections. Link 1114d connecting the central site to the network may be a larger capacity link than the remote site links 114a, b which feed in to it, or it may be the same or even smaller capacity. Similarly, link 114b could have a higher or lower capacity than the sum of remote links 116a-c.

Figure 2:
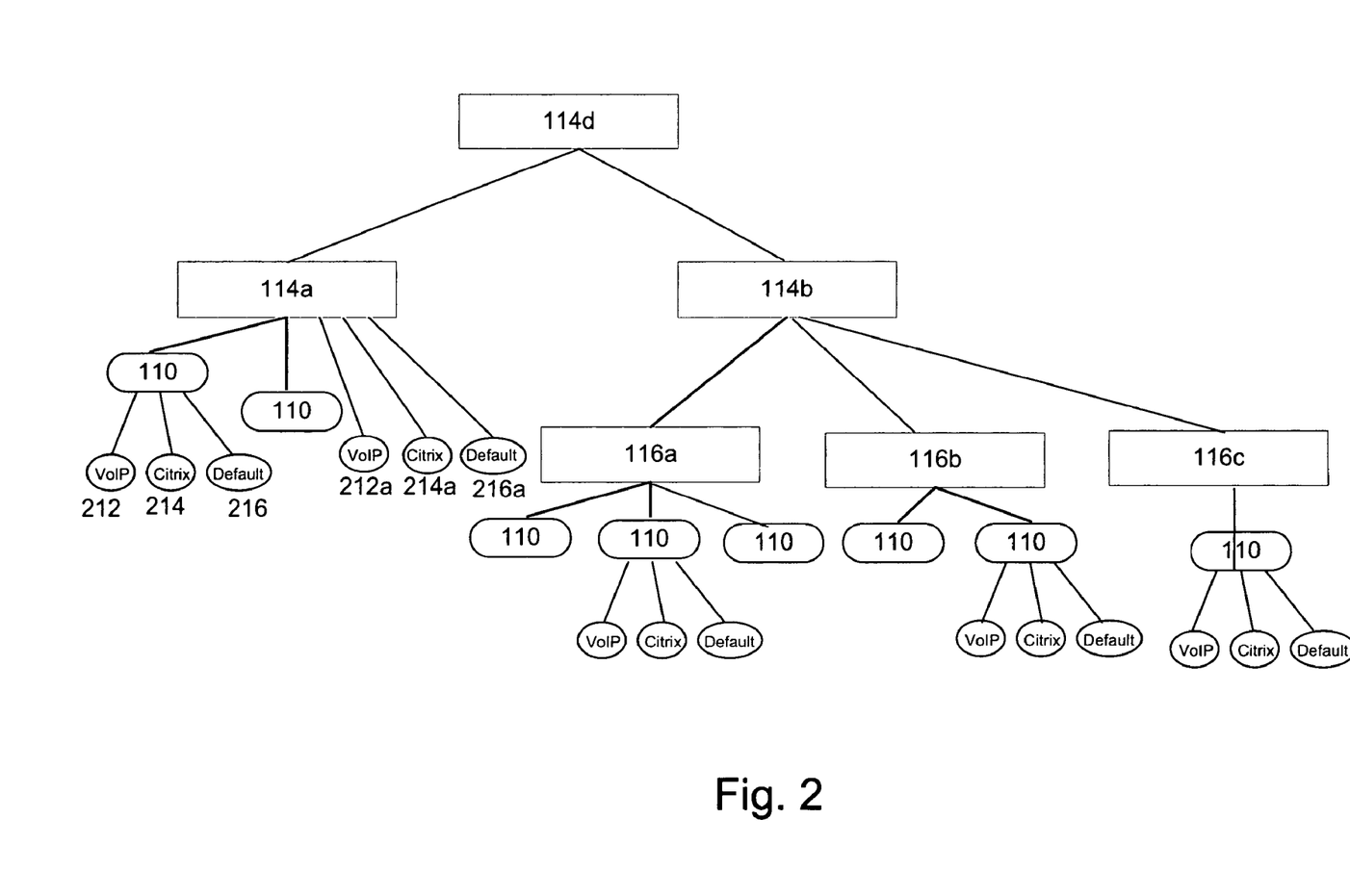
Figure 3:
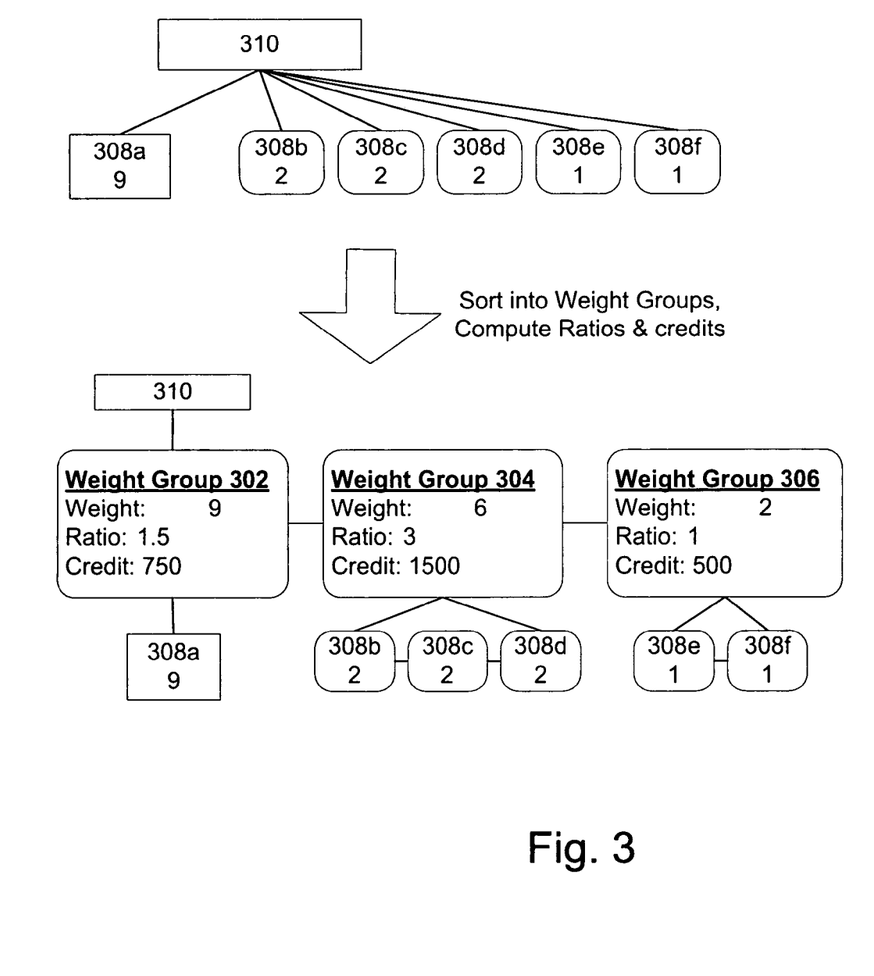
FIG. 3 is a block diagram of a scheduling algorithm.

Another depiction of a network is shown in FIG. 2. Viewed this way, central site link 114d is at the top of the hierarchy. The two remote site links 114a, b are represented by the first level rectangular boxes while local systems 110 at each remote site are represented by rounded boxes. Second level links 116a, b to the more remote sites 112a, b are connected through remote site link 114b. Classes of data traffic originating from the various systems 110 are represented by ovals, e.g., classes 212 for VoIP traffic, 214 for Citrix traffic, and 216 for all other network traffic. Classes are sometimes shown directly feeding into a link, rather than coming through a system 110, e.g. classes 212a, 214a, 216a connected to link 114a. At each level of the hierarchy, a link that represents several links at the next level down is referred to as a link group. For example, the link 114b is a link group that carries traffic from the links 116a and 116b from the remote sites 112a and 112b to the central site 102d via link 114d, as well as traffic on link 116c from the system 110 local to site 102b.

Each link may have a minimum guaranteed bandwidth, that is, the network is configured to assure that the capacity on link 114d associated with traffic for other links 114a, b, 116a, b, c is allocated at least to a minimum configured rate for that link. Links may also be configured with an allowable burst limit, that is, a maximum rate of traffic that the link can generate at any one time. Link oversubscription occurs when the total bandwidth available or used by a set of links into a system or site exceeds the bandwidth available on that site's link to the next level of the network hierarchy. For example, if each of links 116a, b could allow 1 Mb/s, but the outgoing link 114b could only provide 1.5 Mb/s, the link 114b would be oversubscribed. With inadequate scheduling, one link may use too great a portion of the available uplink bandwidth, preventing another link from achieving its guaranteed minimum rate. Conversely, if the upstream link has a larger capacity than all the downstream links, e.g., if link 114b had a capacity of 10 Mb/s in the previous example, it could carry too much traffic and overwhelm the downstream links 114a, b to the remote sites 102a, b. The same problems are present in routing traffic on remote site link 114b to and from second-level links 116a, b. A link scheduler manages the traffic over each link to prevent oversubscription or overflowing of links. Such a scheduler determines which downstream link's traffic shall be carried by the upstream link (in either direction) at any particular time according to a link scheduling algorithm. A single central site scheduler, e.g., at device 108d, may operate at the top level of the network, modeling bottlenecks at all levels of the network to assure that link scheduling at each level is compatible with each other level. For example, a central site scheduler will not send more traffic over link 114d that is ultimately destined for links 116a and 116b than those links can handle, even if intermediate link 114b could handle that much incoming traffic.

In addition to actual connections between devices, different classes of network traffic may have different guaranteed minimum rates and burst limits. For example, VoIP traffic 212 may have a higher minimum and a lower burst rate than Citrix traffic 214 or regular network traffic 216. For traffic within a link, a class scheduler determines which actual data packets to transmit, based on their class and a class scheduling algorithm. A single scheduler or set of schedulers could be implemented at a high level of the hierarchy, and their scheduling determinations cascaded down to the classes of traffic at each remote site. As with link scheduling, class schedulers operate on traffic flowing in either direction. In some examples, certain classes may have preemptive priority, in which case they not only take priority within their link, but the link itself is temporarily given priority over other links to assure packets for that class are quickly transmitted. As the preemptive class and link are satisfied the scheduler updates normal usage counters for the class and link scheduling algorithms.

Within a selected link, a class scheduler is used to determine which data packets actually get transmitted over the link. Packets may be classified based on the application that generated them, priorities assigned by an application, or other factors. CBQ is one algorithm for scheduling traffic based on class. In CBQ, packets are scheduled according to relative priorities based on the type of data represented. For example, VoIP data needs low latency, while regular IP traffic can tolerate reduced latency but may require higher accuracy. In such an example, VoIP packets would be scheduled to be transmitted frequently and promptly, but not in large clusters.

This sort of scheduling is greater than order O(1), meaning that the amount of computation necessary to operate a scheduler varies linearly with the number of classes, which may not be manageable for large networks.

Figure 4:
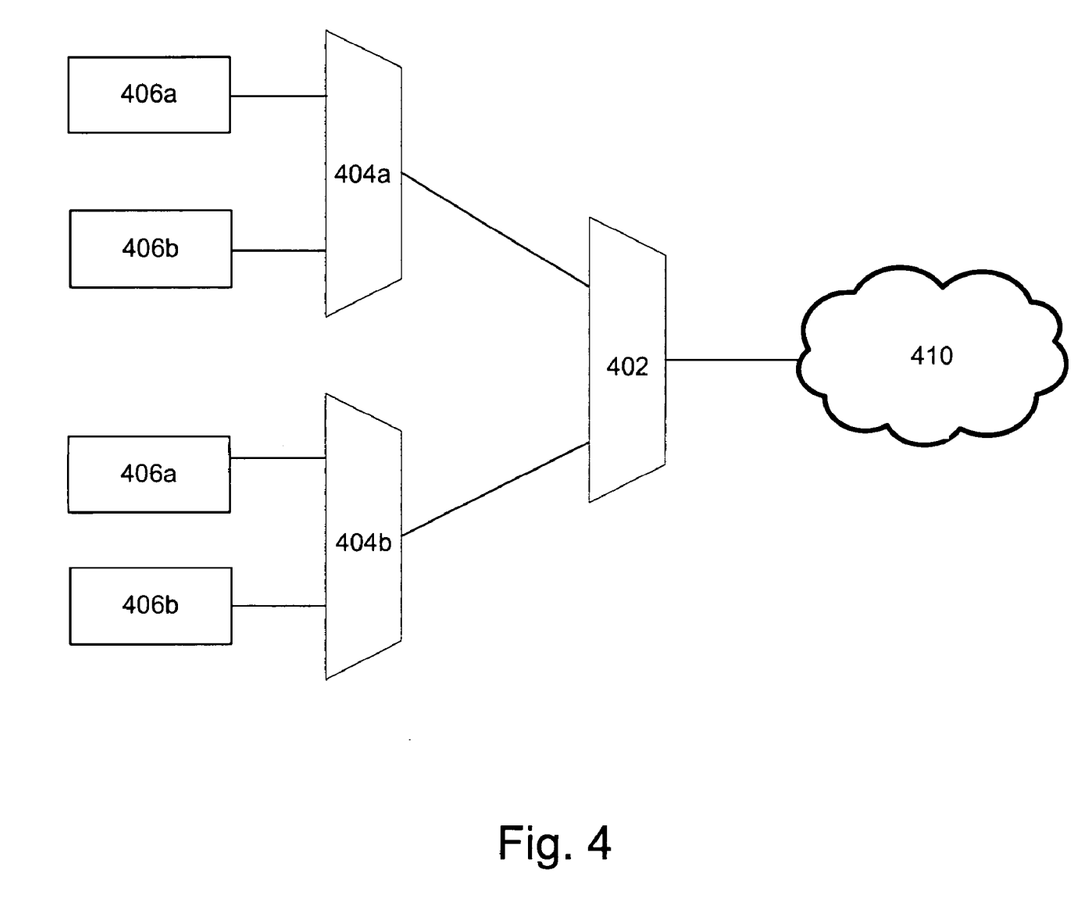
FIGS. 4, 5, and 6 are block diagrams of schedulers.

Link-based scheduling and class-based scheduling can be combined as shown in FIG. 4 to achieve benefits of each without requiring burdensome amounts computation resources. A link scheduler 402 is used to select which link to allocate capacity to, but doesn't actually queue traffic to be transmitted. Rather, it simply selects which class scheduler 404a, b (there being one for each link) to take traffic from. The selected class scheduler 404a or 404b then selects packets from classes 406a, b and delivers them to the link scheduler to be transmitted. The link scheduler transmits packets provided by the class schedulers into the network 410, for example, by sending them to a network interface of the machine on which the scheduler is operating. This process may be repeated at each stage of a hierarchical network like that shown in FIG. 2, or may be done centrally and communicated to the responsible hardware at each site.

The typical packet filter to determine the class queue for a packet can be based on many packet attributes (address, port, type of service, packet flags, etc). However, mixing these filtering attributes allows filters to overlap so they are stored and searched in precedence order, which is O(N). On networks containing hundreds or thousands of links with many classes per link this is not generally scalable. The packet filtering shown in 606 of FIG. 6 uses a route based pre-filtering based on the link subnet definition to determine the link a packet will use. This pre-filtering can use routing algorithms like radix tree to allow an O(log(N)) search. A link only has a few classes, so within the link a normal O(N) precedence search can be done on rules to select the class a packet within the link should use. The class and link determination is then cached as part of a flow table, as disclosed in U.S. Pat. No. 7,010,611, which is incorporated here by reference, so when scheduling future packets the scheduler can do a quick hash to find flow and the previous class and link determination. In some cases this allows O(1) class and link determination.

Another method of regulating network traffic is to route some traffic through "tunnels." Tunnels are virtual connections between endpoints that operate within the actual network topology and that may provide additional features not provided by the network topology itself. Two common types of additional features provided by tunnels are compression and encryption. In a compression tunnel, packets are compressed so that they take up less bandwidth over the actual link used to transmit them. In an encryption tunnel, packets are encrypted so that network elements and users not privy to the encryption tools cannot read or understand intercepted data. Encryption tends to increase the size of packets, and consequently the amount of bandwidth needed to transmit them. In both cases, packets are typically reconfigured (compressed or encrypted) for the tunnel at a stage prior to transmission, producing new packets which are then transmitted, and the process is reversed at the receiving end. In some examples, compression and encryption can be combined in a single tunnel. Both compression and encryption tunnels can complicate network management, since schedulers like those described above may be unable to determine the actual volume of data being transmitted or what class packets belong to. This may lead to inequitable scheduling, for example treating a particular link as if it had exceeded its share of bandwidth, when in fact all its traffic had been compressed after it was scheduled. In the alternative, a scheduler located downstream from the tunnel can take into account actual bandwidth used, but packets are obscured by the tunnel and accounting can't be based on the original classes of the packets.

Figure 5:
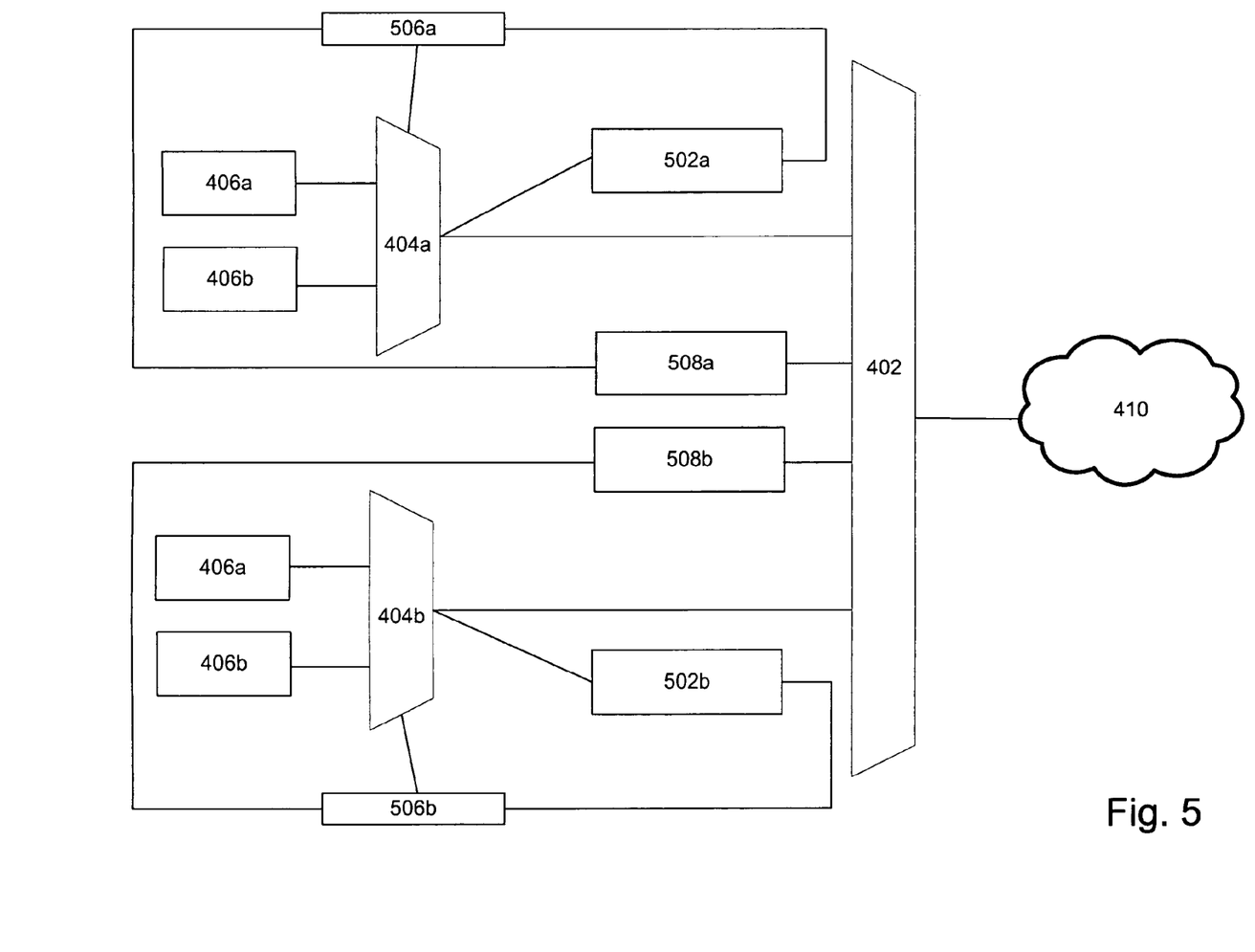

To address these limitations, the combined scheduler discussed above may be combined with a feedback loop, as shown in FIG. 5. Class schedulers sort incoming packets according to both their classification and whether they should go through a tunnel. Packets going through the tunnel are marked as such but they are still scheduled according to their classification. When selected by the class scheduler, they are placed in a queue 502a, b of packets destined for the tunnel. The tunnel processor 506a, b extracts packets from the queues 502a, b. This may include a series of packets based on minimum response time, maximum buffer, or other responsiveness controls. The queued packets are modified by the tunnel processor 506a, b, as appropriate to the type of tunnel, for example, they are compressed or encrypted, generating tunnel packets ready to be transmitted. By queuing packets and processing them together rather than compressing or encrypting them one at a time as they come through, greater compression efficiencies can be realized. This also avoids wasting bandwidth or CPU time when tunnel demands exceed capacity, and the resulting congestion can be managed by the schedulers. In other cases the tunnel processing may be performed on per-packet invocations without queues 502a, b and 508a, b and are then immediately transmitted onto the network 410.

The compression ratio (or equivalently, a data expansion ratio) or other measure of tunnel performance that was achieved by the tunnel processes 506a, b is fed back to the class schedulers 404a, b, so they can determine an estimate of the bandwidth that will actually be used by the packets of each class, despite the fact that the original class of the packets may not be recognized when they are ultimately transmitted. The tunnel packets carrying the originally sent data packets are then returned to the beginning of the process, where they are identified as having already been processed for the tunnel. These packets then skip the class scheduler, since the original packets which make up the tunnel packets were already handled by that scheduler, and go directly to a queue 508a, b for the outgoing link scheduler. When the link scheduler next selects that link for transmission, it transmits both those packets in the post-tunnel queue 508a, b, and those provided to it by the class scheduler 404a, b. Links are scheduled based on the actual bandwidth they use, after compression or encryption of their tunnel packets, rather than on the amount of bandwidth they appeared to need before the packets were processed for the tunnel. Classes, meanwhile, are scheduled based on both the actual amount of raw data belonging to the class and the actual amount of post-tunnel-processing data that was transmitted.

Since tunnel packets are processed a second time by the link scheduler, it can treat them as their own queue, and by allocating a particular share of the corresponding link's bandwidth, the maximum bandwidth used by the tunnel can be controlled. Both the amount of data going into the tunnel and the amount of data actually used by the tunnel can be monitored and regulated. This process also allows classes to be set up prior to the tunnel and yet for the compression to be taken into account when scheduling particular classes. This may allow a class to exceed its allocated link bandwidth. For example, if a class is allocated a bandwidth of 1 Mb/s, but it put through a tunnel with a compression ratio of 2.times., the class can be allowed to transmit 2 Mb/s without exceeding its allocation.

When the transmitted packets reach their destination, tunnel packets are processed to extract the original packets from which they were composed. These packets are then sent along to their ultimate destination, which may include processing through another set of schedulers and transmission over yet another uplink to another tier of the network.

Figure 6:
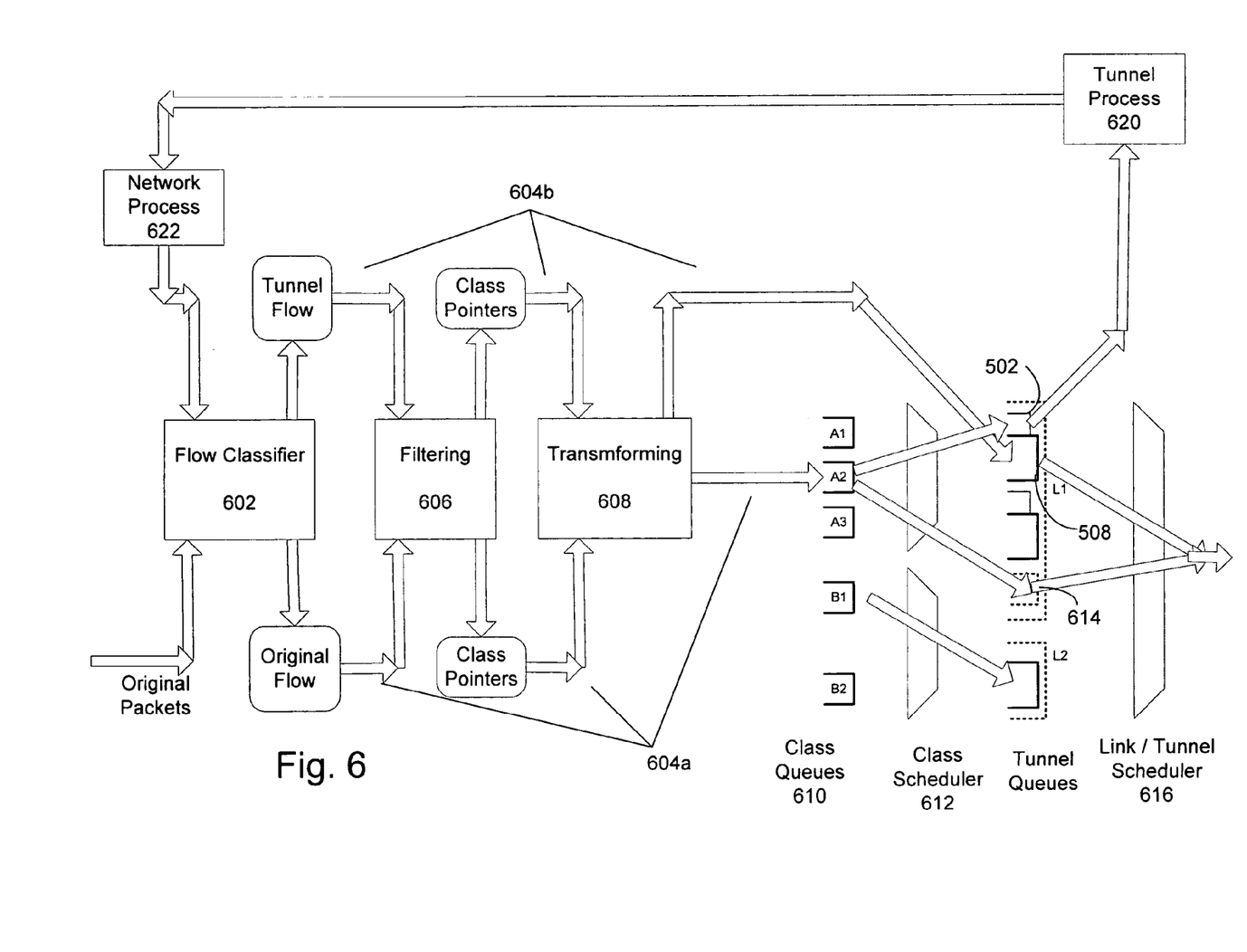

Components of the schedulers can be reused for both pre-tunnel and post-tunnel packets, as shown in FIG. 6. As packets enter the scheduling process, a flow classifier 602 classifies the packets and attaches a description of the packet including a reference to which flow (link, class, etc.) it was a part of. Both original packets and packets that have been through the tunnel processing once already go through the same flow classifier. The flow classifier and filtering determines whether a particular incoming packet should be routed through the tunnel, and includes that in its description. The fact that a packet has already been processed for the tunnel is another of the factors that goes into the classification and description of the packet. As packets move on to the next stage, they retain a reference to the flow they are a part of. Original packets are shown going through one pathway 604a and tunnel packets through another pathway 604b, though this distinction is merely for purposes of illustration. In a filtering stage 606, packets are filtered according to their routes, classes, and whether they are to be excluded from the tunnel. Packets may be excluded from the tunnel because of the nature of the data or the priority of the application generating them, or because they have already been processed for the tunnel. For example, low-latency packets for VoIP may not be routed through a compression tunnel, because the time taken to compress the packets and route the tunnel packets back through the schedulers would violate the latency requirements of that class of data. Filtered packets retain their class identification as they pass on to the next stage.

Filtered packets next pass through a transforming stage 608 where additional actions may be performed, such as redirecting/hijacking packets to other processes, caching, rate-shaping, TOS (type of service) setting, imposing session limits, etc. This stage intercepts packets that have already been processed for the tunnel and directs them to the link scheduler, bypassing the class scheduler. New packets are queued in class queues 610 to be processed by the class scheduler 612. The class scheduler 612 then directs packets destined for the tunnel to a tunnel queue 502. The tunnel process 620 will later extract these packets. Directing packets to the tunnel queue does not use the outbound link, so while the tunnel process is taking packets from the tunnel queue 502, the link scheduler takes packets from the post-tunnel queue 508 and requests packets from the class scheduler 612 for the selected link (path 614). Once it has sent the appropriate number of packets on to the outbound link, the link scheduler 616 moves on to the next link according to the scheduling algorithm. The link scheduler 616 may take into account whether a packet is a tunnel packet or a regular packet in selecting a packet to transmit on the network. For example, the link scheduler may be configured to interleave tunnel and non-tunnel packets to limit congestion within the network for each link being traversed. The scheduler can prevent a run of packets on an individual link from overwhelming that link.

Packets for the tunnel are queued as discussed above, processed by tunnel processor 620, and returned to a network process 622, for example, a TCP/IP, UDP, IP-TUN, IP-SEC, or SNP process, as if they were new packets to be transmitted. The network process 622 sends the packets to the flow classifier 602. Since a single set of components can be used for both new and tunnel-processed packets, the feedback loop may be maintained without adding additional components. The class scheduler 612 tracks the amount of traffic for each class that it has directed to the tunnel, and receives feedback from the link scheduler 616 on how much bandwidth the tunnel packets actually used. This information is used by the class scheduler 612 to accurately account for the amount of bandwidth used by each class. Traffic can be managed based on the real classification of all packets, but each class accounted for based on the actual amount of data transmitted, including the tunnel savings.

This system has the advantage of a packet scheduler running prior to the tunnel so that it is allowed to manage traffic in classes before they are obscured, i.e., encrypted, or aggregated, i.e., compressed. For example, all database traffic can be scheduled at 10 Mb/s, and because of the compression tunnel, the total throughput can be up to 15 Mb/s, if either all traffic is compressed at a ratio of 1.5.times. or half the traffic is compressed at 2.times. By sharing traffic management mechanisms, monitoring can be performed to show the relationship of pre-compression traffic usage and post-compression usage.

This system also has the advantage that if a tunnel was not established when network connections were initiated, or fails once established, packets destined for the tunnel can simply be transmitted like any other packet, and the class scheduler can schedule packets from each class according to the full amount of bandwidth used by each class.

Figure 7:
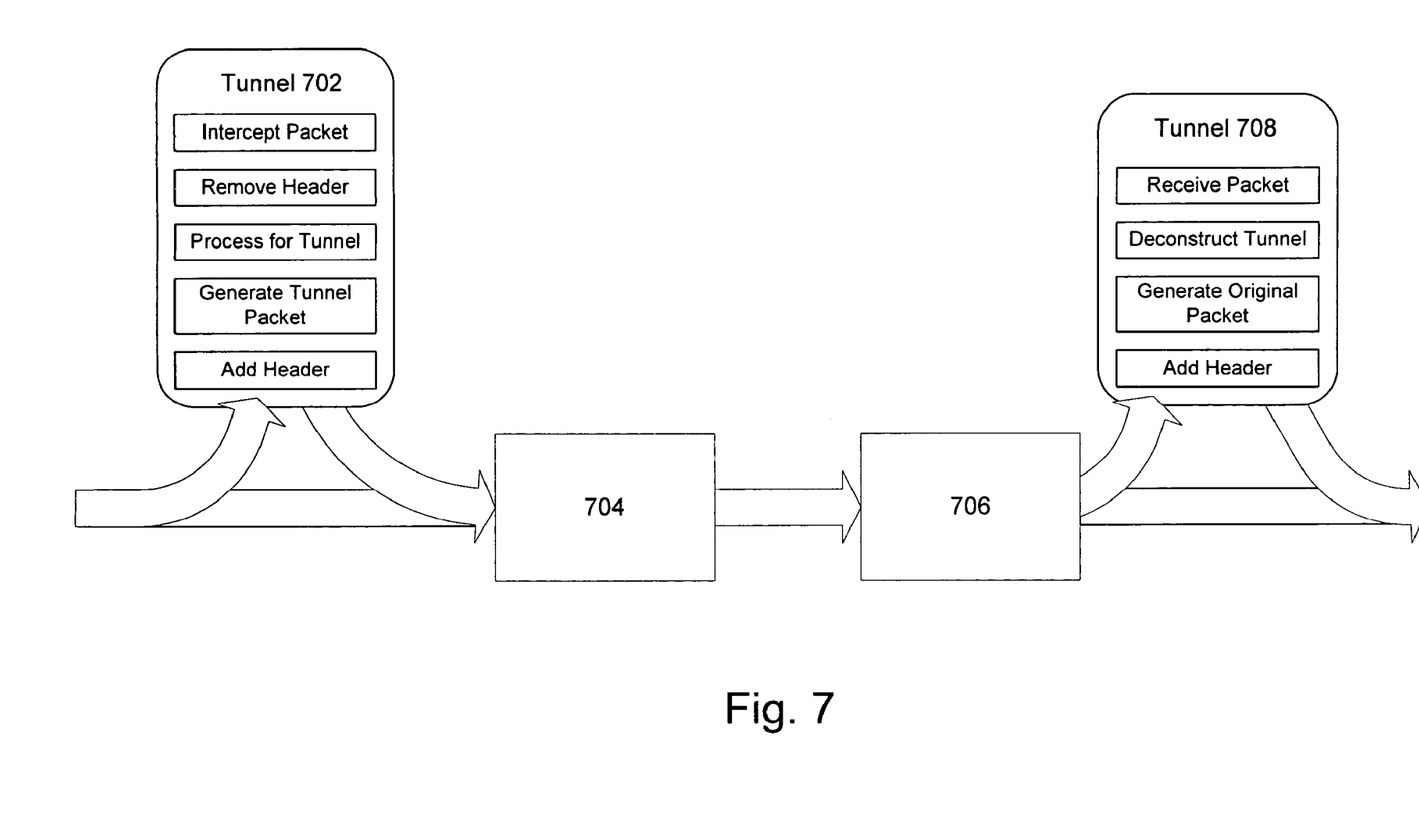
FIG. 7 is a block diagram of a tunnel process.

In some examples, processing packets for inclusion in the tunnel includes the process shown in FIG. 7. Packets identified for the tunnel are essentially hijacked out of their intended data pathway and routed into a tunnel process 702. When packets enter the tunnel process 702, they have a header which includes network routing information, such as the MAC (media access control) address of the next device 704 in the network that was expected to process the packet. Since the packet will be combined with others into a tunnel packet, and unpacked farther along the network to continue to its final destination, some of that routing information, e.g., the MAC address, has become moot and is removed from the original packet before the packet is processed and incorporated into a tunnel packet. A header is added to the tunnel packet, which directs the tunnel packet along the network and may be the same as the header that was removed from each of the constituent packets. At the receiving end 706 of the outbound link, a complementary process 708 to the outgoing tunnel process 702 unpacks the tunnel packets (for example, decompressing or decrypting them) and restores the original packets. At that point, the process returns the packets to the network kernel, which looks up new routing information, including the MAC address of the next machine each packet should be sent to, and uses that to create a new header. The packet is then sent on its way.

In some examples, tunnels are defined when the network is first initialized, and information about them is used in the above processes. A definition file is created which identifies all routes through the network, that is, all the pairs of machines that can transfer data between each other. This includes an identification of which pairs of machines should serve as endpoints of tunnels, for example, by compressing and decompressing some or all of the packets that travel between them, and the attributes of those tunnels. This definition file is communicated to all of the machines participating in routing traffic over the network. Each machine takes from this file the information that is relevant to it, such as identification of other machines to which it can create tunnels. The machine then sets up the tunnels expected of it, for example, by configuring the components necessary to process packets sent to the tunnel by the link scheduler in the processes described above. A centralized provisioning server can be provided to define all of the tunnels for a network and generate the definition file.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A device for regulating network traffic by routing packets through tunnels, virtual connections between endpoints within network topology, comprising a processor configured by a software program to perform:
   tunnel creation;
   schedule links; and
   schedule classes:
   wherein said tunnel creation is between a source and a destination of said endpoints wherein said endpoints are operative to
   receive a tunnel definition file which defines at least one of an encryption tunnel type and a compression tunnel type,
   read at least one identified pair of endpoints for each tunnel type from said tunnel definition file, and
      create at least one tunnel with an endpoint with which said device is paired according to said tunnel type;
      said schedule links to measure tunnel performance;
      to determine an estimate of the bandwidth that will actually be used by the packets of each class, to identify a packet of the packets as having already been processed for the tunnel, to queue tunnel packets for the outgoing link scheduler, to schedule tunnel packets based on said estimate of the bandwidth to be used by the packets after compression or after encryption, and
      said schedule classes based on both the actual amount of raw data belonging to the class and the actual amount of post-tunnel-processing data at the destination endpoint.

* * * * *